United States Patent
Charish

(10) Patent No.: US 8,098,807 B2
(45) Date of Patent: Jan. 17, 2012

(54) METHOD AND SYSTEM FOR PROVIDING AN AUDIO CONFERENCE

(75) Inventor: Avrohom Y. Charish, Lakewood, NJ (US)

(73) Assignee: Cinchcast, Inc., New York, NY (US)

( * ) Notice: Subject to any disclaimer, the term of this patent is extended or adjusted under 35 U.S.C. 154(b) by 1152 days.

(21) Appl. No.: 11/784,082

(22) Filed: Apr. 5, 2007

(65) Prior Publication Data

US 2008/0247528 A1    Oct. 9, 2008

(51) Int. Cl.
H04M 3/42    (2006.01)
H04L 12/16    (2006.01)
H04Q 11/00    (2006.01)

(52) U.S. Cl. ......... 379/202.01; 379/203.01; 379/204.01; 379/205.01; 370/260; 370/261; 370/262

(58) Field of Classification Search ............. 379/202.01, 379/203.01, 204.01, 205.01; 709/204; 370/260, 370/352, 261, 262; 455/556
See application file for complete search history.

(56) References Cited

U.S. PATENT DOCUMENTS

| | | | |
|---|---|---|---|
| 6,167,432 A | 12/2000 | Jiang | |
| 6,195,357 B1 | 2/2001 | Polcyn | |
| 6,272,214 B1 * | 8/2001 | Jonsson | 379/202.01 |
| 6,314,094 B1 | 11/2001 | Boys | |
| 6,418,214 B1 | 7/2002 | Smythe et al. | |
| 6,487,585 B1 | 11/2002 | Yurkovic | |
| 6,577,716 B1 | 6/2003 | Minter et al. | |
| 6,594,269 B1 | 7/2003 | Polcyn | |
| 6,609,096 B1 | 8/2003 | De Bonet et al. | |
| 6,658,325 B2 | 12/2003 | Zweig | |
| 6,678,737 B1 | 1/2004 | Bucher | |
| 6,760,750 B1 | 7/2004 | Bonch | |
| 6,904,264 B1 | 6/2005 | Frantz | |
| 6,985,694 B1 | 1/2006 | De Bonet et al. | |
| 6,990,312 B1 | 1/2006 | Gioscia | |
| 6,993,004 B2 | 1/2006 | Boys | |
| 7,017,120 B2 | 3/2006 | Shnier | |
| 7,058,694 B1 | 6/2006 | De Bonet et al. | |
| 7,076,202 B1 | 7/2006 | Billmaier | |
| 7,171,174 B2 | 1/2007 | Ellis et al. | |

(Continued)

OTHER PUBLICATIONS

Talkshoe.com Articles from http://web.archive.org/web/*http://talkshoe.com dated Apr. 12, 2006-Mar. 25, 2007.

*Primary Examiner* — Thjuan K Addy
(74) *Attorney, Agent, or Firm* — Perkins Coie LLP

(57) ABSTRACT

A method and system for providing an audio conference includes receiving audio from a moderator via a circuit-switched telephone network, transmitting a representation of the audio to a first listener group via the circuit-switched telephone network, and transmitting a representation of the audio to a second listener group via a packet-switched network. The audio conference is preferably transmitted to the first listener group and the second listener group in real-time or near real-time (e.g., within a few seconds). Although the method and system could be used with any suitable circuit-switched telephone network, the method and system are preferably used with a public switched telephone network. Further, although the method and system could be used with any suitable packet-switched network, the method and system are preferably used with the Internet.

26 Claims, 12 Drawing Sheets

U.S. PATENT DOCUMENTS

| | | | |
|---|---|---|---|
| 7,664,103 B2* | 2/2010 | Chu et al. | 370/352 |
| 2002/0049852 A1 | 4/2002 | Lee et al. | |
| 2002/0082046 A1* | 6/2002 | Peters et al. | 455/556 |
| 2002/0091769 A1* | 7/2002 | Drozdzewicz et al. | 709/204 |
| 2002/0136382 A1* | 9/2002 | Cohen et al. | 379/202.01 |
| 2004/0039794 A1 | 2/2004 | Biby et al. | |
| 2004/0062210 A1* | 4/2004 | Genter et al. | 370/260 |
| 2004/0193683 A1 | 9/2004 | Blumofe | |

* cited by examiner

METHOD AND SYSTEM FOR PROVIDING AN AUDIO CONFERENCE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable.

BACKGROUND OF THE INVENTION

A. Technical Field

This invention relates generally to the audio conference field, and more specifically to an improved method and system for providing an audio conference in real-time or near real-time with streaming audio.

B. Background

There are several methods and systems that facilitate an audio conference between a moderator, one or more guests and several listeners. At the very basic level, a radio talk show uses the radio spectrum to transmit audio from the moderator, and uses the telephone network to receive audio from a listener. In the digital realm, services such as SKYPECAST use the Internet to transmit audio from the moderator and to receive audio from a listener. The radio talk show requires the listener to have both a radio and a telephone, while the SKYPECAST service requires the listener to have a computer, a downloaded and installed client on their computer, and a microphone.

Thus, there is a need in the field of audio conferences for an audio conference system and method that simplifies the requirements of the user and/or broadens the available audience. This invention provides such method and system.

SUMMARY OF THE INVENTION

In one embodiment, the present invention relates to a method of providing an audio conference in near real time. In the method, audio is received from a moderator via a network. Then, a representation of the audio is transmitted to one or more first listener(s) via a public switched telephone network, and a representation of the audio is transmitted to one or more second listener(s) via the Internet.

In one version, the method further comprises the step of providing the moderator with a telephone number that corresponds to a moderator position within the audio conference. The telephone number can be posted on a web page or provided in an advertisement typically distributed to the public.

In another version, the method further comprises the step of maintaining the conference upon disconnection of the moderator from the conference to permit the moderator to re-connect into the conference. Assuming that the moderator calls back into the conference, the moderator is reconnected.

The first listener can be provided with a telephone number that corresponds to a listener position within the audio conference, and the second listener can be provided with a URL that corresponds to a listener position within the audio conference. In this version of the invention, an encoded and streaming representation of the audio is transmitted to the second listener via the Internet.

In another version of the present invention, information related to the audio conference can be displayed to the moderator via the Internet. The information can include the caller identification of the first listener, or the number of listeners that receive the representation of the audio via the PSTN, or the number of listeners that receive the representation of the audio via the PSTN and via the Internet. The information can be displayed to the moderator using the Internet and an Internet browser.

In yet another version of the present invention, a signal indicating a desire to contribute audio to the audio conference from the first listener can be accepted. For example, the signal can include one or more dialed tones on the PSTN. Once the signal is accepted, the first listener is joined into the audio conference and audio is received from the first listener via the public switched network, for example, and a representation of the audio from the first listener is transmitted to the second listener.

In another aspect of the present invention, an input from the moderator via the Internet to play an audio file can be accepted, and a representation of the audio file is transmitted to the first and second listeners.

In each of the embodiments described above, a representation of the audio conference (including audio file(s) played) can be recorded for purposes of archival or later playing, or streamed in real-time to virtually any listener wishing to listen to the audio conference.

In another version, the present invention relates to a computer program product that, when executed by a machine, provides an audio conference in real time. The computer program product includes instructions to receive audio from a moderator via a public switched telephone network, instructions to transmit a representation of the audio to a first listener via the PSTN; and instructions to transmit a representation of the audio to a second listener via the Internet.

In another version, the present invention relates to a method for administrating network-based audio conferencing. The method includes the steps of enabling a two-way audio conference between a moderator and a guest, encoding, in real-time, audio data indicative of the two-way audio conference in a streaming format; and publishing a representation of the audio data in the streaming format in real-time. The step of publishing is can be implemented by storing the audio data in the streaming format on computer readable medium accessible by a streaming server having a URL; and providing a hyperlink to the URL of the streaming server on a web page to publish the stored audio data.

In yet another version, the present invention relates to an audio server system for establishing two-way audio communication between a moderator terminal and a guest terminal. The audio server system comprises a conferencing system and a media encoder. The conferencing system enables two-way audio communication between the moderator terminal and the guest terminal. The media encoder receives audio data representative of the two-way audio communication, and encodes the audio data representative of the two-way audio communication in a streaming format. The audio server system also includes means for publishing, while the two-way audio communication between the moderator terminal and the guest terminal is ongoing, the two-way audio communication in a streaming format.

In yet another version, the present invention relates to an audio server system for establishing two-way audio communication between a moderator terminal and a guest terminal, the audio server system being accessible by a listener terminal via the Internet. The audio server system includes a conferencing system, a media encoder, a streaming server, and a web server. The conferencing system enables two-way audio communication between the moderator terminal and the guest terminal. The media encoder receives audio data representative of the two-way audio communication in real-time, and encodes the audio data representative of the two-way audio communication in a streaming format. The media encoder stores the two-way audio communication in the streaming format on one or more computer readable medium. The streaming server has a URL and also has access to the two-way audio communication in the streaming format. The web server provides a web page having a hyperlink including the URL of the streaming server whereby upon activation of the hyperlink by the listener terminal, the listener terminal is directed to the URL of the streaming server to stream the two-way audio communication to the listener terminal.

BRIEF DESCRIPTION OF THE SEVERAL VIEWS OF THE DRAWING

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENTS

Figure 1:
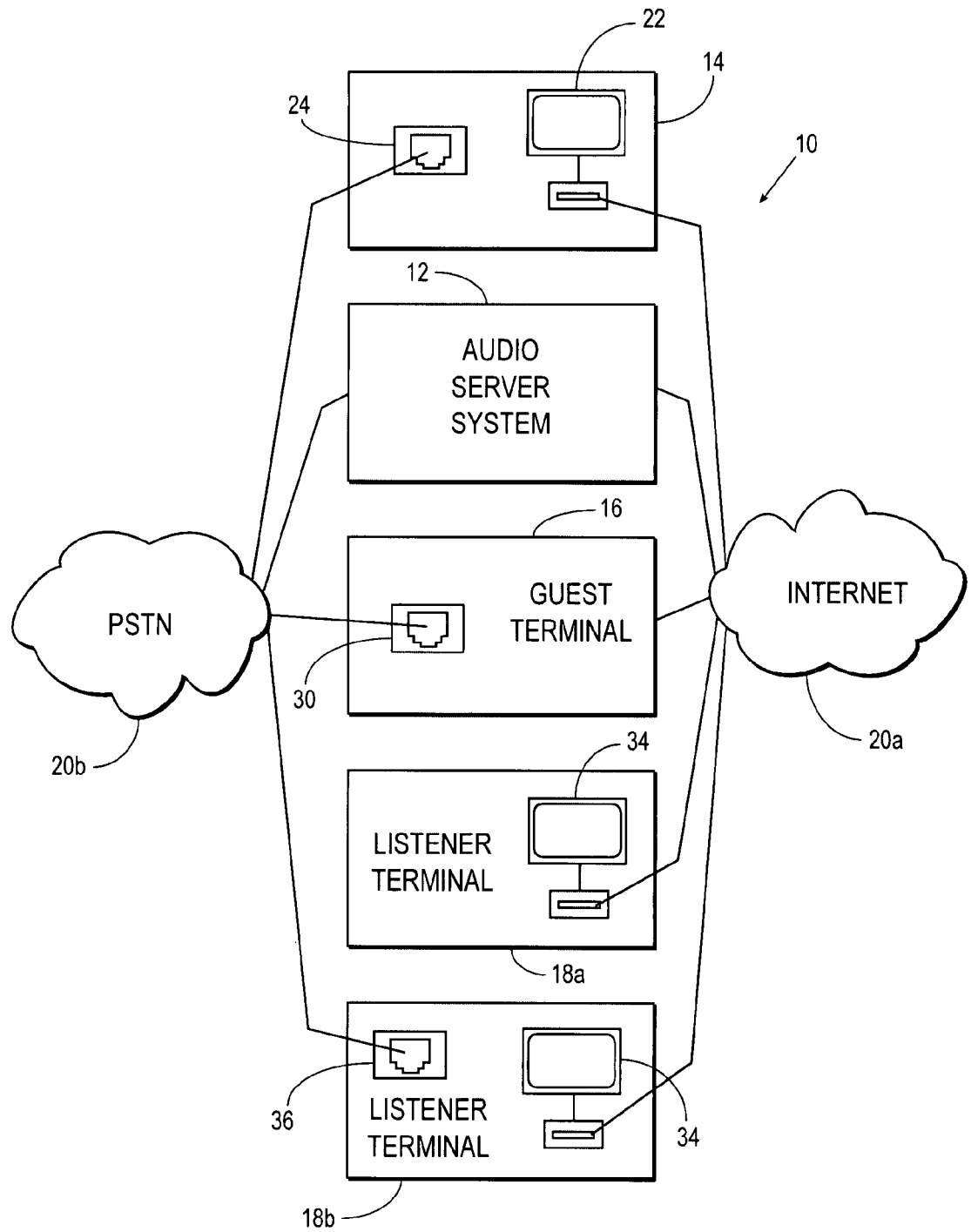
FIG. 1 is a schematic representation of an audio conference system constructed in accordance with the present invention.

The following description of the preferred embodiments of the invention is not intended to limit the invention to these preferred embodiments, but rather to enable any person skilled in the art to make and use this invention. Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

1. Hardware of the System

As shown in FIG. 1, the present invention is a computer-based system and method which administrates network-based audio conferencing enabling users to schedule, moderate, and attend network-based conferences, without manual system administration. One preferred use of the present invention is to schedule and administer one or more simultaneous talk shows. As will be described in more detail below, in a preferred embodiment, the computer-based system is a platform that allows a person to moderate a live talk show online using only a telephone and a computer terminal having access to the Internet and a web browser.

Referring to FIG. 1, shown therein is a block diagram of an exemplary audio conferencing system 10 suitable for implementing embodiments of the present invention. The audio conferencing system 10 includes one or more audio server system 12; one or more moderator terminal 14; one or more guest terminals 16; one or more listener terminals 18a and 18b; and one or more network 20a and 20b. Only one of the audio server system 12, one or the moderator terminal 14, one or the guest terminals 16, two listener terminals 18a and 18b; and two networks 20a and 20b are shown in FIG. 1 for purposes of clarity.

The moderator terminal 14 includes a computer terminal 22 and a two-way audio communication device 24, such as a landline telephone, mobile telephone, VOIP, soft phone or the like, indirectly connected to the audio server system 12 via the networks 20a and 20b. Although the two-way audio communication device 24 is shown separately, the two-way audio communication device 24 can be implemented as a part of the computer terminal 22 so long as such computer terminal 22 is adapted for audio communication. For example, the computer terminal 22 can be provided with a suitable microphone and speaker system. In addition, the two-way audio communication device 24 can be adapted to communicate with the audio server system 12 using either the network 20a or 20b. As discussed below, the computer terminal 22 is preferably provided with a web browser to permit the moderator to access a variety of information provided by the audio server system 12 regarding the network-based conferences. Such information may include call-in telephone numbers, scheduling information or the like and is preferably provided on a web-page.

The network 20a may be a packetized or packet-switched network such as the world's public IP-based packet-switched networks, also known as the Internet or some other network-type, such as a wide area network (WAN) or local area network (LAN). The network 20b may be a circuit-switched network such as a public switched network typically used to make telephone calls, i.e., the network of the world's public circuit-switched telephone networks, also known as the PSTN. However, it should be understood that the networks 20a or 20b may be provided as other types of networks, such as a cellular telephone network. For purposes of clarity, the network 20a will be referred to hereinafter as a "packetized" or "packet-switched" network, and the network 20b will be referred to hereinafter as a "switched network". In a preferred embodiment, the two-way audio communication device 24 is a conventional telephone provided separately from the computer terminal 22 and communicates with the audio server system 12 via the switched network 20b.

The guest terminal 16 is also provided with a two-way audio communication device 30, which is shown by way of example as a telephone connected to the switched network 20b. However, it should be understood that the communication device 30 can be implemented in other manners, such as a computer terminal having suitable software and a microphone and speaker, or a landline telephone, mobile telephone, soft phone or voice over internet telephone. In addition, the guest terminal 16 may also be provided with a computer terminal (not shown) having access to the network 20a and also having a web browser to permit the guest to access a variety of information provided by the audio server system 12 regarding the network-based conferences. Such information may include call-in telephone numbers, scheduling information or the like and is preferably provided on a web-page.

The listener terminals 18 include a computer terminal 34 for accessing a variety of information provided by the audio server system 12, such as call-in telephone numbers, scheduling information, one-way audio streams of real-time or near real-time network based audio conferences, or stored audio streams of past (not real-time) audio conferences. The listener terminals 18 may also include a separate one-way communication device 36 permitting the listener to listen to audio streams of real-time or near real-time network based audio conferences. The one-way communication device 36 can be implemented, by way of example, as a two-way communication device, such as a landline telephone, mobile telephone, soft phone or voice over internet telephone, only allowing the listener to listen to the audio streams of real-time or near real-time or past network based audio conferences.

The computer terminal 22, or 34 may be a computer having an Internet connection, for example through a direct Internet connection, a LAN, or through an Internet service provider. The computer terminals 22 or 34 may be a windows-based PC, a Macintosh, a cellular telephone or a personal data assistant for example. The computer terminals 22 or 34 preferably include speakers and web-browser software, such as Microsoft's "Internet Explorer" or Netscape's "Navigator", having audio/video player software such as RealNetwork's "Real Player" or Windows® Media Player for receiving media streams. The computer terminal 22 may also include a microphone and software for audio output/input to permit two-way audio communication with the audio server system 12.

Figure 2:
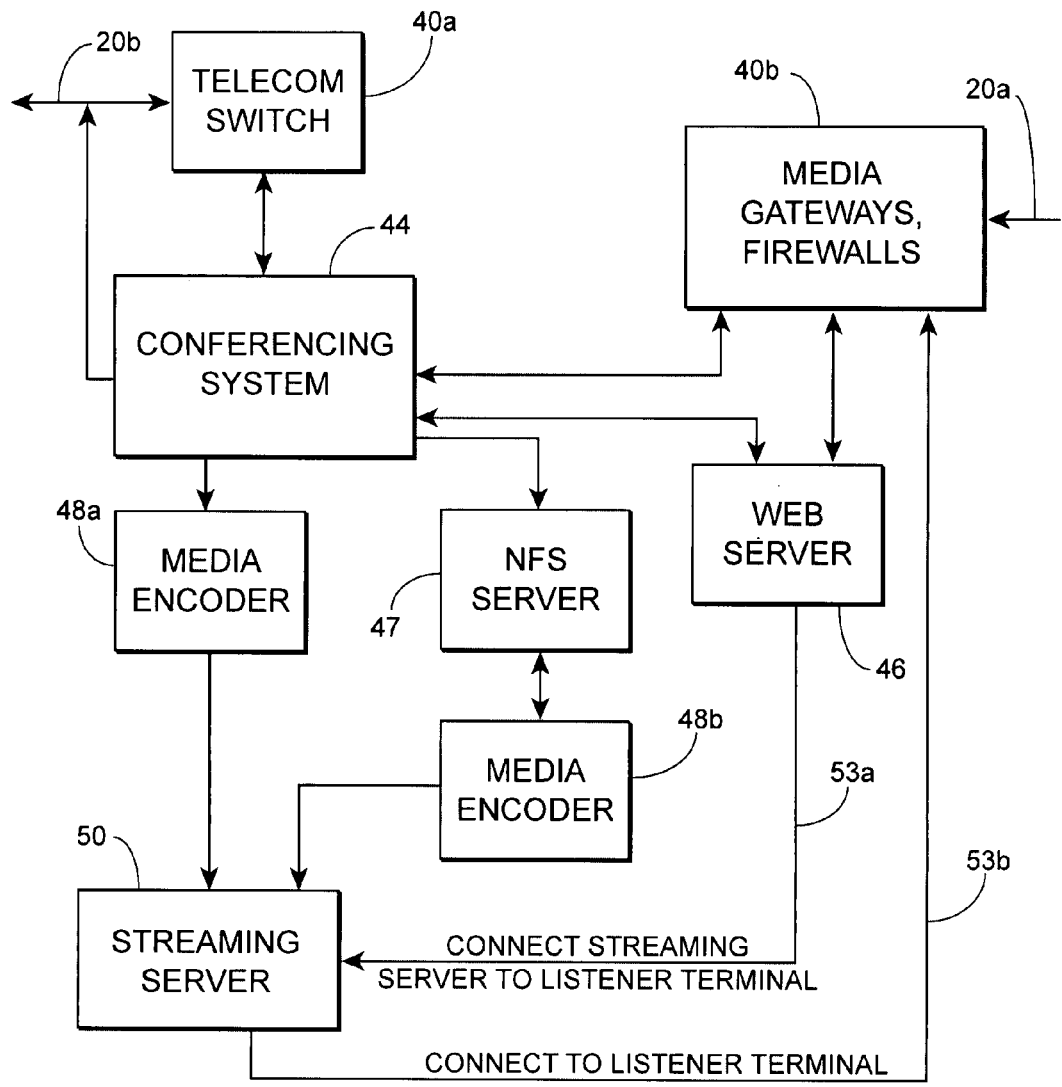
FIG. 2 is a schematic representation of an audio server system constructed in accordance with the present invention.

One embodiment of the audio server system 12 is shown in more detail in FIG. 2. The audio server system 12 is provided with one or more interface devices 40a and 40b for interfacing the audio server system 12 with the networks 20. In the example shown, the interface device 40a is shown as a telecom switch 40a for communicating with the switched network 20b, and the interface device 40b is shown as one or more media gateway, and firewall 40b for communicating with the packetized network 20a.

The audio server system 12 is also provided with a conferencing system 44, a web server 46, one or more NFS servers 47, one or more real-time media encoder 48a, one or more archive media encoder 48b and a streaming server 50. The moderator terminal 14, and the guest terminal(s) 16 communicate with the conferencing system 44 via the networks 20a, 20b and interface devices 40a and 40b to provide a telephone conference connection for two-way audio communication during the network based audio conference. The listener terminal(s) 18 communicate with the conferencing system 44, or the streaming server 50 to receive one-way or two-way communication during the network based audio conference. When the listener terminal(s) 18 communicate with the conferencing system 44 in a two-way manner, i.e., unmuted, such listener terminal(s) 18 are functioning as guest terminal(s) 16.

The real-time media encoder 48a receives, in real-time or near real-time, the audio data (or a representation thereof) of the network based audio conference and converts such audio data (or a representation thereof) into a streaming media format. Such audio data in the streaming media format is then passed to the streaming server 50. The streaming server 50 receives the audio data in the streaming media format, and then, as will be discussed in more detail below provides the audio data in the streaming media format to the listener computers 18 via either the network 20a.

During the audio conference, the conferencing system 44 outputs a representation of the audio data to the NFS server 47 to record the representation of the audio data and save such representation as a file. Once the audio conference is over, the file is output to the archive media encoder 48b, which encodes the representation of the audio data into a streaming format, and provides such representation of the audio data to the streaming server 50. A hyperlink or button may then be provided to a web page provided by the web server 46 containing a URL directing a listener terminal 18 to the representation of the audio data in the streaming format hosted by the streaming server 50. It should be understood that the real-time media encoder 48a and the archive media encoder 48b can be implemented as a same media encoder, or separately.

The audio server system 12 also includes the web server 46. The web server 46 functions as an interface between the conferencing system 44 and the streaming server 50 of the audio server system 12 and the network 20a, and runs web server software (stored on one or more computer readable medium) to generate and deliver various web pages for display at the moderator, guest and listener terminals 14, 16 and 18. As discussed in detail below, such web pages delivered by the web server 46 include various input sections and graphical user interfaces (GUIs) which enable (1) remote moderator users to interactively schedule, setup, and control two-way communication access to the network based audio conference, (2) remote guest users to interactively join, communicate with the moderator and listen to the network based audio conference, and (3) remote listeners to listen to the network based audio conference or become guests. The web server 46 enables remote listeners to listen to the real-time or near real-time network based audio conference by connecting the listener terminals 18 to the streaming server 50. In one embodiment, the web server 46 can also connect the listener terminal 18 to the conferencing system 44. This feature is described in more detail below.

In a preferred embodiment, the various web pages provided by the web server 46 are available to the public via the network 20a and the web server 46 connects listener terminals 18 to the streaming server 50 without typically requiring any authentication, invitation or verification (in certain instances authentication or verification may be required, such as when the show includes explicit material—and—in certain instances the moderator can send out invitations to promote their show). So, the network based audio conference is made available for essentially any listener having a listener terminal 18 capable of accessing the web server 46 and having streaming media software loaded on their listener terminal 18 for converting the representation of the audio data in the streaming media format into sound. As will be discussed in more detail below, due to the compatibility of the audio server system 12 with the packetized network 20a and the switched network 20b the moderator(s), guest(s) and listener(s) can setup, schedule, participate and/or listen to the network based audio conference utilizing conventional telephones and computers having web browsers. Therefore, in one preferred embodiment, the moderator terminal 14, the guest terminal 16 and the listener terminal 18 do not require any software specifically adapted to communicate solely with the audio server system 12.

2. Overview of function of the Audio Conferencing System 10

During a network based audio conference, audio is received by the conferencing system 44 from the two-way communication device 24, e.g., the telephone, of the moderator terminal 14 via the network 20b. The conferencing system 44 transmits a representation of the audio to guest terminal(s) 16 or listener terminal(s) 18 in a first listener group via the network 20b, and also transmits (or at least makes available) a representation of the audio to guest terminal(s) 16 or listener terminal(s) 18 in a second listener group via the packetized network 20a. The audio conference is preferably transmitted to the first listener group and the second listener group in real-time or near real-time (e.g., within a time delay of a few seconds).

Preferably, a moderator is a person who wishes to transmit voice, music, or any other suitable audio for one or more talk shows and utilizes the moderator terminal 14 to communicate with the audio server system 12 via the network 20a or 20b. From the standpoint of the system 10, the moderator is preferably identified by a password (such as a PIN), but may be identified by any suitable method, such as CallerID or voice signature. Preferably, a talk show is scheduled for a particular day and time and may be scheduled for a particular timeslot (including start time and end time). The talk show is preferably associated with a particular moderator (or moderators). A talk show can preferably be described as 'scheduled', 'pre-show', 'in progress', or 'completed'. The web server 46 can be adapted to permit the moderator to invite guests or listeners to the audio conference. In this regard, the moderator can login to a computer system hosted by the web server 46 and customize and send e-mail invites to friends and colleagues.

A "guest" is a listener who wishes to listen to the talk show and also engage in two-way communication with the moderator(s) during the talk show. From the standpoint of the system 10, the guest may be identified by a password (such as a PIN), or any other suitable method, such as CallerID or voice signature.

A "listener," or "first listener", or "second listener" is a person who wishes to listen to the talk show and receive the voice, music, or other suitable audio from the moderator and/or guest. From the standpoint of the system 10, a listener is preferably not authenticated or verified by any particular method such as a password (such as a PIN), callerID or voice signature, although certainly the telephone number, IP address or other identifier of the listener terminal 18 may be automatically provided to the audio server system 12 for an identification of the listener terminal 18.

A first listener group is one or more listeners or guests in separate locations. A second listener group is one or more listeners or guests in separate locations from the listeners or guests in the first listener group.

A "computer readable medium", as used herein, refers to a device capable of storing data in a format that can be read by a computer. Examples of "computer readable mediums" include a memory, a magnetic disk, an optical disk or a tape.

3. Receiving and Transmitting Audio

A person seeking to be a "moderator" typically visits the web server 46 utilizing their moderator computer 22 and signs up for a show and agrees to a password. Then, the web server 46 provides the moderator with a moderator telephone number. After the moderator signs up for a show and agrees to a password, the moderator preferably calls the moderator telephone number and identifies themselves with the password, as shown in FIG. 2 to connect to the conferencing system 44. If there is a show scheduled to start within a predetermined period (such as 15 minutes), an audio signal is transmitted to the moderator (as a pre-recorded voice) indicating the time until the start of the show. During the talk show, audio is typically passed from the moderator terminal 14 via the network 20b to the conferencing system 44. The audio may be transmitted through the circuit-switched telephone network 20b using any suitable audio codec. Preferably, the telecom switch 40a evaluates the caller ID of the moderator, and uses the G.729 audio codec for phone calls from an international (or remote) location and the PCMU audio codec for phone calls from a domestic (or nearby) location. However, other types of audio codecs could be used.

Then, a representation of the audio is transmitted to the guest terminal 16 or listener terminal 18 of one or more listeners or guests in a first listener group via the telecom switch 40a and network 20b to deliver a representation of the voice, music, or any other suitable audio from the moderator to one or more guests and listeners. The representation of the audio may be an exact representation of the voice, music, or any other suitable audio transmitted from the moderator. The representation of the audio, however, is preferably a compressed, filtered, censored, or otherwise processed version of the voice, music, or any other suitable audio transmitted from the moderator. The audio may be transmitted through the circuit-switched telephone network 20b using any suitable audio codec. Preferably, the audio method and system evaluates the caller ID of the moderator, and uses the G.729 audio codec for phone calls from an international (or remote) location and the PCMU audio codec for phone calls from a domestic (or nearby) location. However, other types of codecs could be used.

The audio server system 10 preferably provides the first listener group with a listener telephone number that corresponds to a particular moderator or show. The listener telephone number is typically provided to the guests or listeners in the first listener group by posting the listener telephone number on a web page associated with the particular moderator or show provided by the web server 46. However, the listener telephone number can be provided in other manners, such as by including the listener telephone number in advertisements for the talk show.

When a first listener calls the listener telephone number, the conferencing system 44 may be configured to play an audio clip (such as a "greeting") associated with the particular moderator or show. If there is a show scheduled to start within a predetermined period (such as 15 minutes), the conferencing system 44 preferably transmits an audio signal to the first listener (as a pre-recorded voice) indicating the time until the start of the show. Although the audio conference system 10 preferably does not require a password from the first listener, the system 10 may require a password from the first listener in certain situations (e.g., shows with explicit material).

The audio server system 12 can also transmit or pass a representation of the audio to a second listener group in real-time or near real-time via the network 20a. Because the audio received from the moderator typically occurs over a circuit-switched telephone network 20b, the representation of the audio is typically not an exact representation of the voice, music, or other suitable audio transmitted from the moderator. The representation of the audio is automatically provided to the media encoder 48a, and the NFS server 47 from the conferencing system 44. The NFS server 47 records the representation of the audio (in real-time or near real-time) and saves the representation as a file. The real-time streaming of the representation of the audio is preferably accomplished by setting the media encoder 48a up as a "listener" of the audio conference. In one embodiment, this is accomplished by placing an inbound or outbound phone call to the media encoder 48a by the conferencing system 44 to connect the media encoder 48a as a "listener" of the audio conference. Preferably, the connection between the conferencing system 44 and the media encoder 48a utilizes a high quality codec.

As discussed above, the audio stream can be provided to the listener or the guest utilizing either the network 20a or 20b. To listen to the audio stream utilizing the network 20a, the listener or guest utilizes their guest terminal 16 or listener terminal 18 to browse a web page associated with the moderator or talk show. The web page can be provided with suitable hyperlink(s) (see for example the hyperlink 174 shown in FIG. 14) adapted to provide a listener URL that corresponds to a particular moderator or show to the listener terminal 18 preferably upon activation by the listener. When the listener points their web browser to the particular URL, the audio server system 12 connects the listener terminal 18 to the streaming server 50 to connect the listener to the audio stream. This can be implemented by the web server 46 sending a signal via a signal path 53a to the streaming server 50 to activate the streaming server 50 to connect to the listener terminal 18 via a signal path 53b, or by the web server 46 providing the listener URL to the listener terminal 18 and then the listener terminal 18 connecting to the streaming server 50 via the signal path 53b. The signal paths 53a and 53b are shown separately for purposes of illustration, however, the signal paths 53a and 53b could be the same or different.

To connect to the audio conference via the network 20b, the moderator, guest or listener uses their terminal 14, 16 or 18 to dial into the audio conference utilizing a "call-in" number. Or, the moderator, guest or listener can utilize their terminal 14, 16 or 18 to view a web page from the web server 46 and actuate a hyperlink that actuates an outbound call to connect to the conferencing system 44 using Voice Over IP via the networks 20a and the media gateways, firewall 40b.

The streaming server 50 may be configured to play an audio and/or video clip (such as a "greeting") associated with the particular moderator or show. If there is a show scheduled to start within a predetermined period (such as 15 minutes), the system 10 preferably include a step of transmitting an audio and/or video signal to the listener indicating the time until the start of the show. Although the system 10 preferably does not require a password from the second listener, the system 10 may require a password from the second listener in certain situations (e.g., shows with explicit material).

3. Example Implementation

FIGS. 3-9 are exemplary web pages generated by a web server of the audio server system in accordance with an embodiment of the present invention. In particular, FIGS. 3-9 illustrate exemplary web pages enabling the moderator to control the network-based audio conference in accordance with the present invention.

Figure 3:
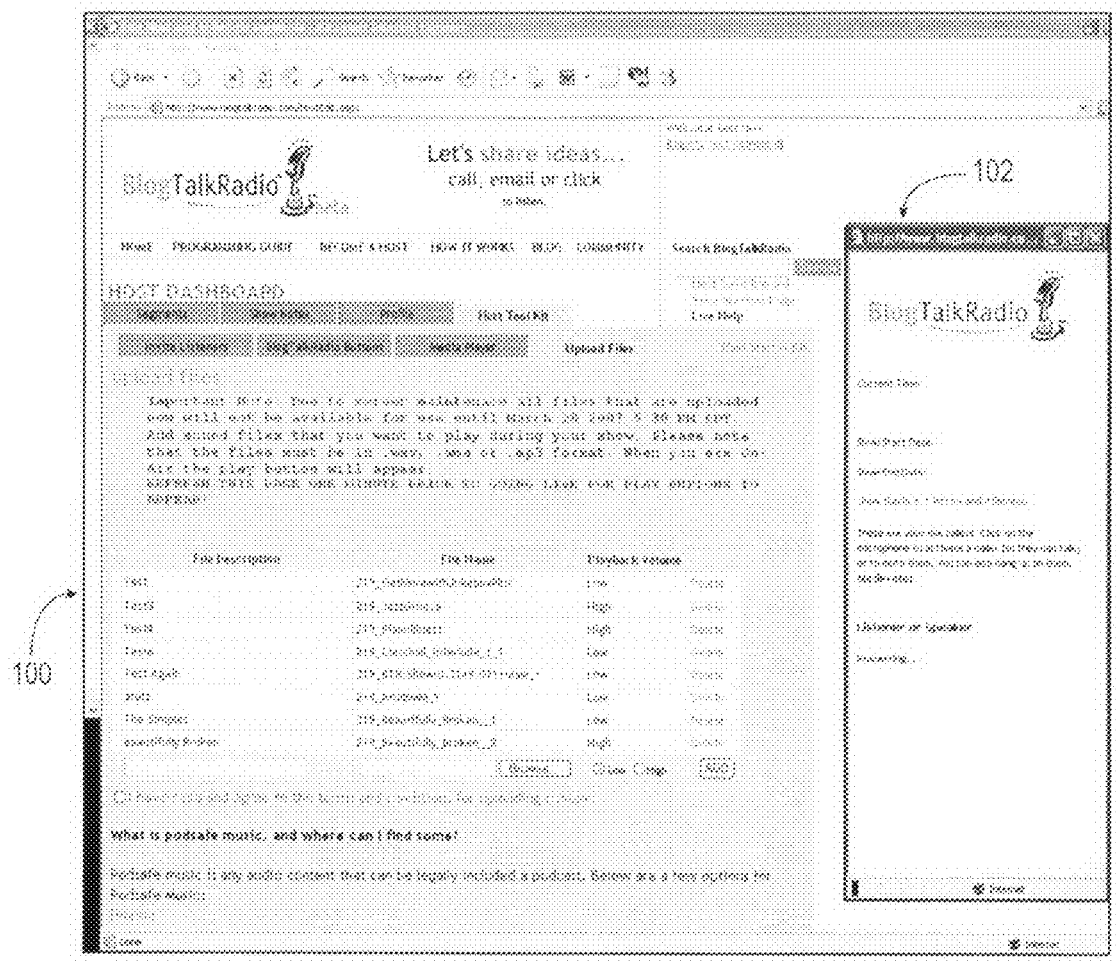
FIG. 3 are exemplary "upload files" and "moderator status" web pages generated by a web server of the audio server system in accordance with an embodiment of the present invention.

Shown in FIG. 3 is an exemplary "upload files" web page 100 generated by the web server 46 of the audio server system 12 in accordance with an embodiment of the present invention. The "upload files" web page 100 has an upload file area to permit the moderator to upload sound files to the audio server system 12 for playing during the audio conference. The sound files can be in any suitable format, such as .wav, .wma or .mp3 format. When the moderator is hosting the audio conference, the upload files page will include a "play button" or other suitable hyperlink permitting the moderator to play the sound files during the audio conference.

Figure 6:
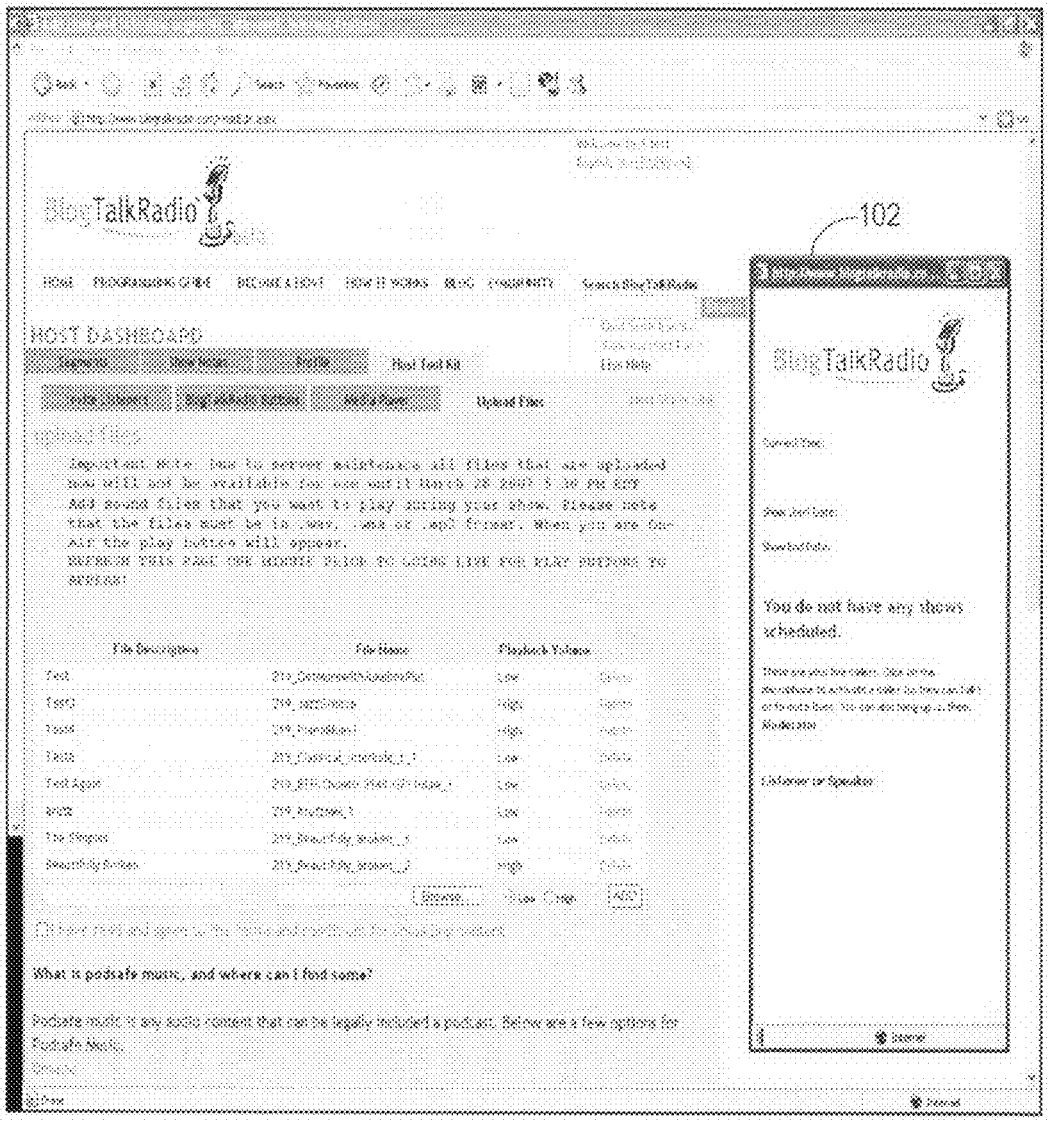
FIG. 6 is another exemplary "moderator status" web page generated by the web server of the audio server system in accordance with an embodiment of the present invention.
Figure 7:
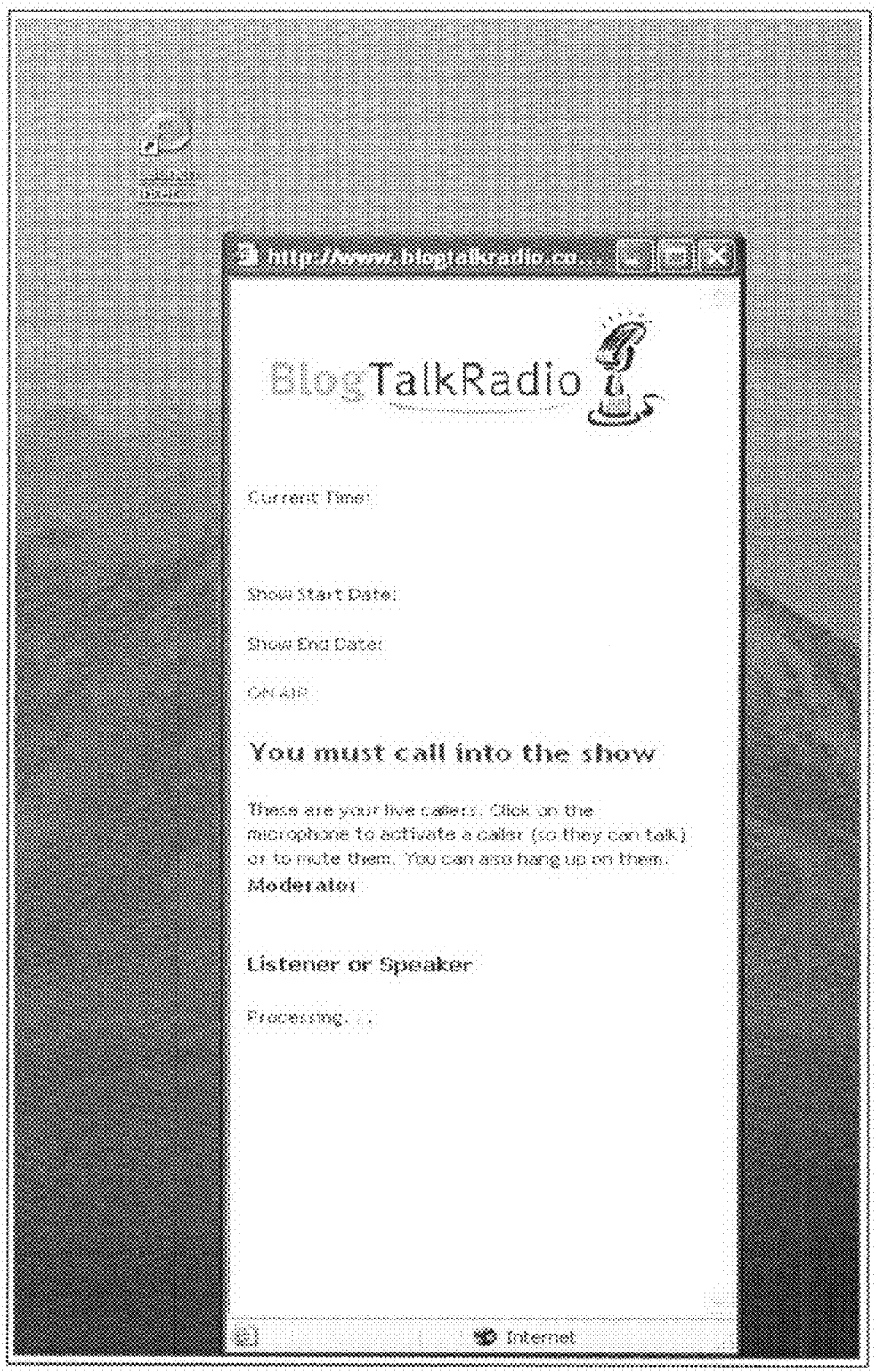
FIG. 7 is yet another exemplary "moderator status" web page generated by the web server of the audio server system in accordance with an embodiment of the present invention.
Figure 8:
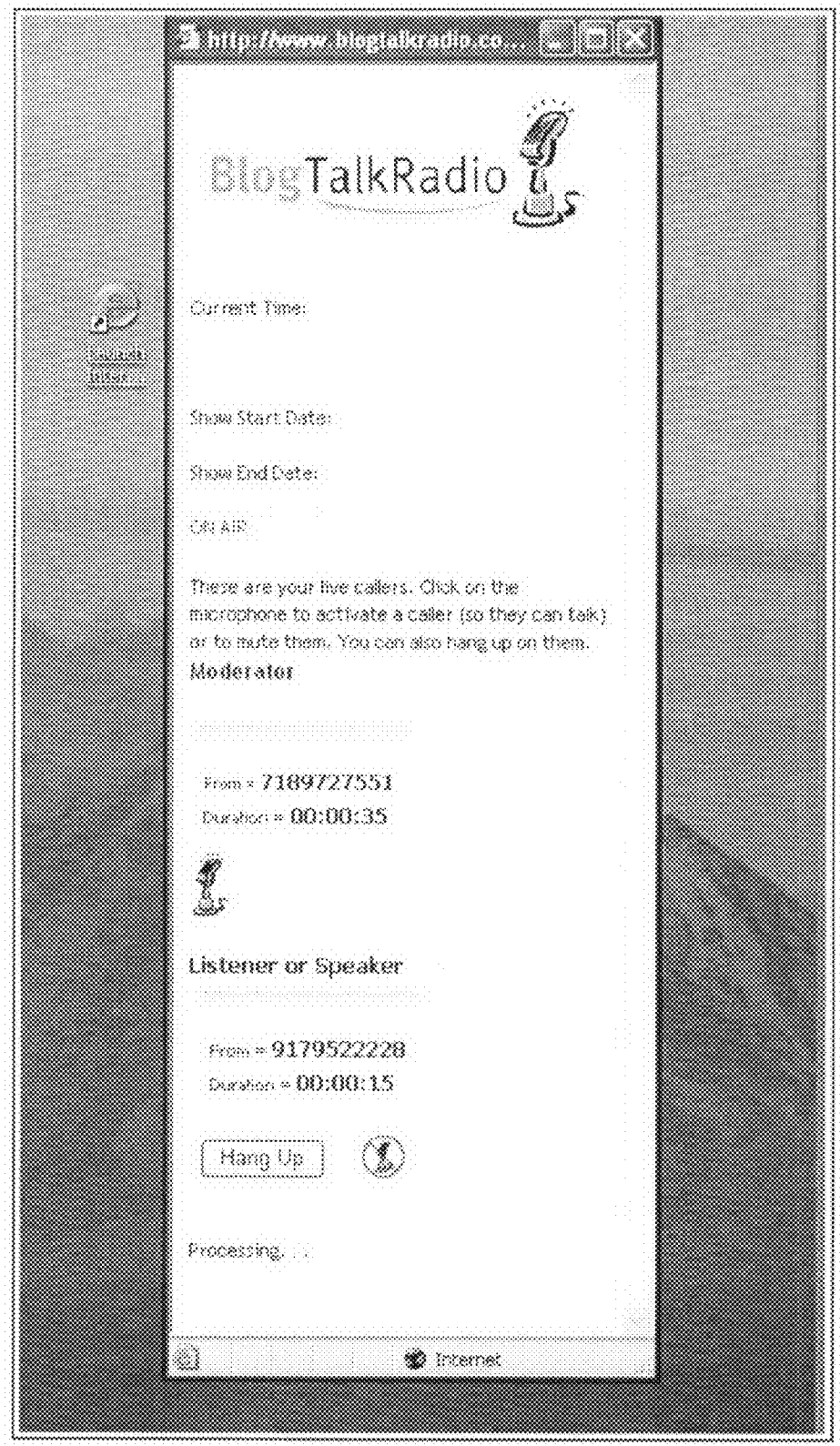
FIG. 8 is another exemplary "moderator status" web page generated by the web server of the audio server system in accordance with an embodiment of the present invention.

Shown in FIGS. 3, 6, 7 and 8 are exemplary "moderator status" web pages 102 generated by the web server 46 of the audio server system 12. The "moderator status" web page 102 includes the current status of the audio conference. As shown in FIG. 3, the moderator does not currently have any shows scheduled. As shown in FIG. 6, the web page 102 indicates that the show will start in 1 minute and 4 seconds. As shown in FIG. 7, the web page 102 indicates that the show has started and that the moderator needs to call into the show. As shown in FIG. 8, the show has started and one listener or speaker, i.e., guest, is currently listening to the show.

Figure 4:
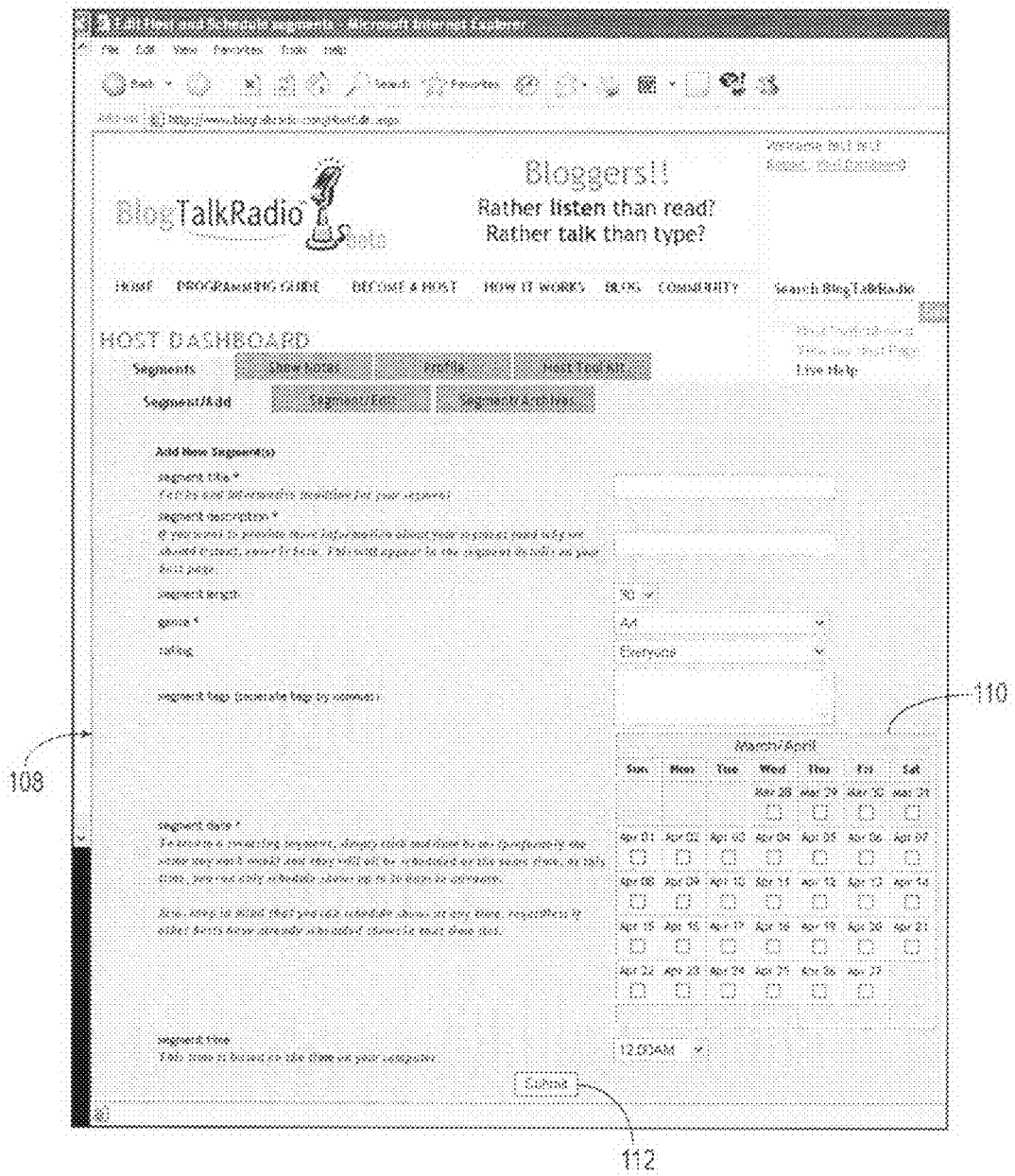
FIG. 4 is an exemplary "Segments" web page generated by the web server of the audio server system in accordance with an embodiment of the present invention.

Referring to FIG. 4, shown therein is an exemplary "Segments" web page 108 generated by the web server 46 of the audio server system 12. The "segments" web page 108 includes a variety of fields permitting the moderator to schedule various information with respect to a proposed talk show, such as segment title, segment length, genre, rating, or segment tags. In addition, the "segments" web page 108 includes a scheduling area 110 permitting the moderator to select the date and time of the proposed talk show, as well as a select button 112 enabling the moderator to submit the schedule of the proposed talk show.

Figure 5:
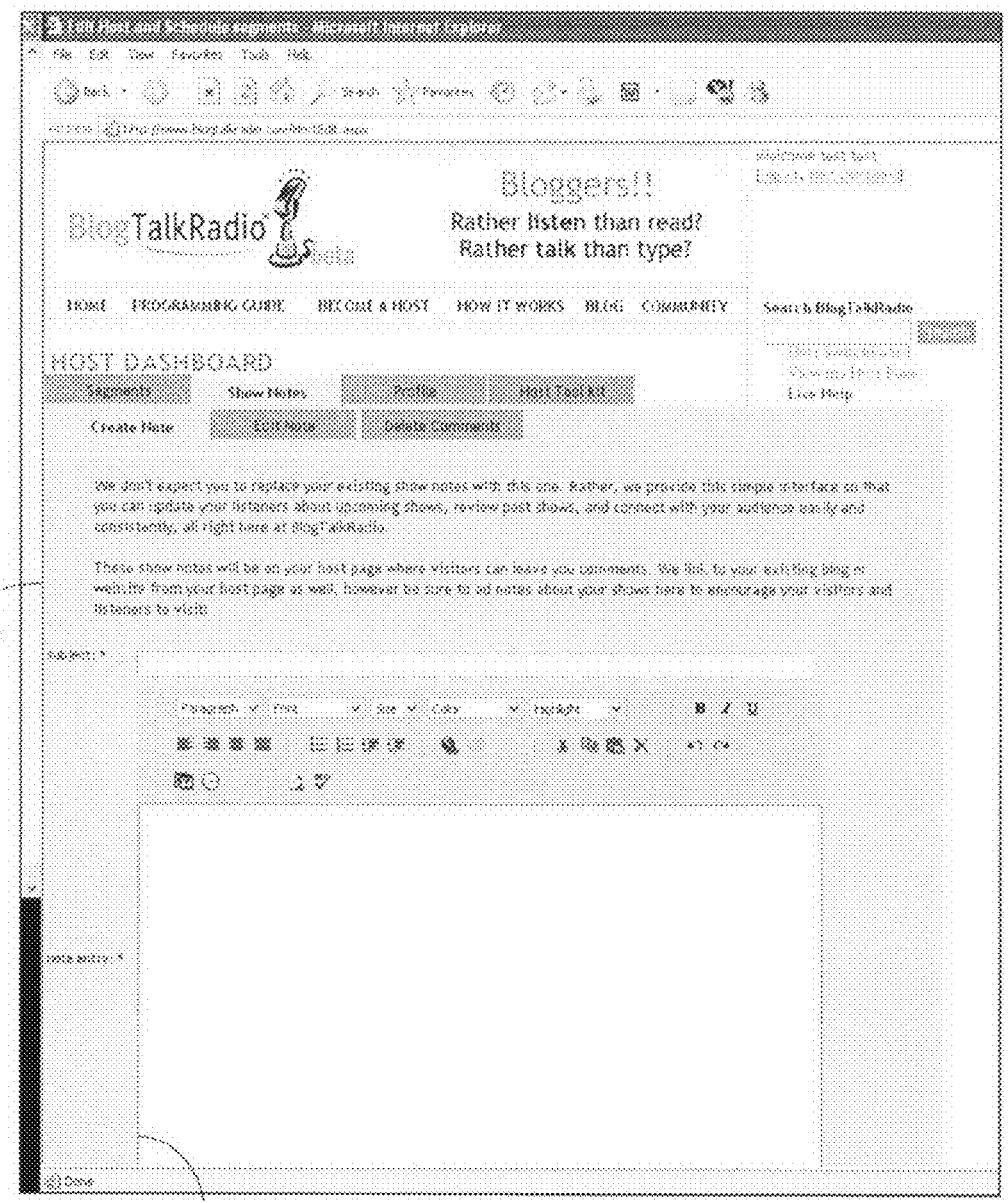
FIG. 5 is an exemplary "Show Notes" web page generated by the web server of the audio server system in accordance with an embodiment of the present invention.

Referring to FIG. 5, shown therein is an exemplary "Show Notes" web page 114 generated by the web server 46 of the audio server system 12. The "show notes web page 114 has a note area 116 permitting the moderator to provide notes to listeners or guests. Once notes are entered into the "show notes" web page, such notes are then provided to listeners or guests of the show by the web server 46.

Figure 9:
FIG. 9 is an exemplary "segment/archives" web page generated by the web server of the audio server system in accordance with an embodiment of the present invention.

Referring to FIG. 9, shown therein is an exemplary "segment/archives" web page 120 generated by the web server 46 of the audio server system 12. The segment archives web page provides a list of prior shows, organized by moderator, which have been recorded and are available to listen to.

Figure 10A:
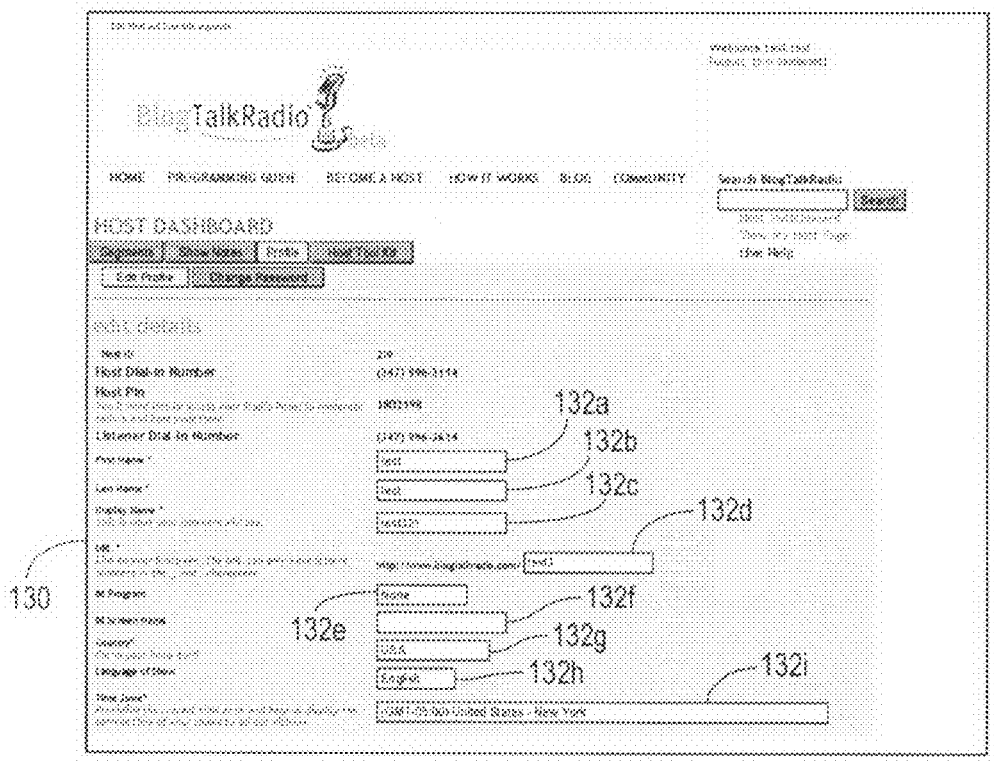
FIGS. 10a and 10b cooperate to illustrate an "edit profile" web page generated by the web server of the audio server system in accordance with an embodiment of the present invention.
Figure 10B:
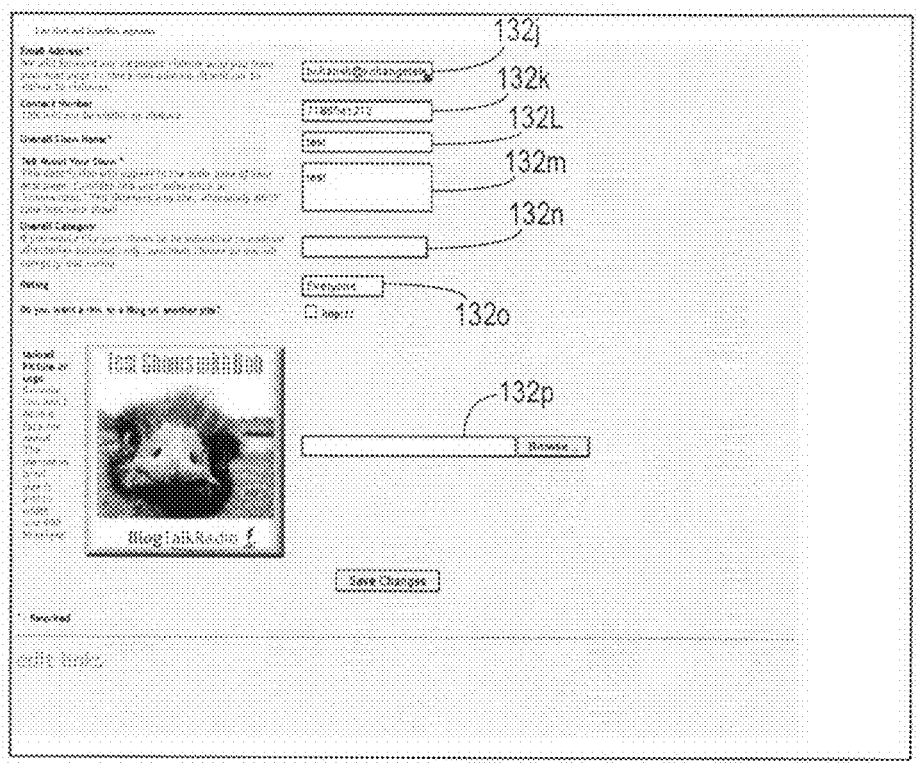

FIGS. 10a and 10b cooperate to illustrate an "edit profile" web page 130 generated by the web server 46 of the audio server system 12. The web page 130 includes a variety of fields 132a-p for collecting information related to the moderator. Examples of such information include first name, last name, display name, URL address for linking to the moderator's home page, instant messaging program, instant messaging screen name, country of residence, language of show, time zone, e-mail address, contact telephone number, overall show name, description of show, rating, and overall category for submitting the show to podcast directories automatically, and a picture or logo for the show.

Figure 11:
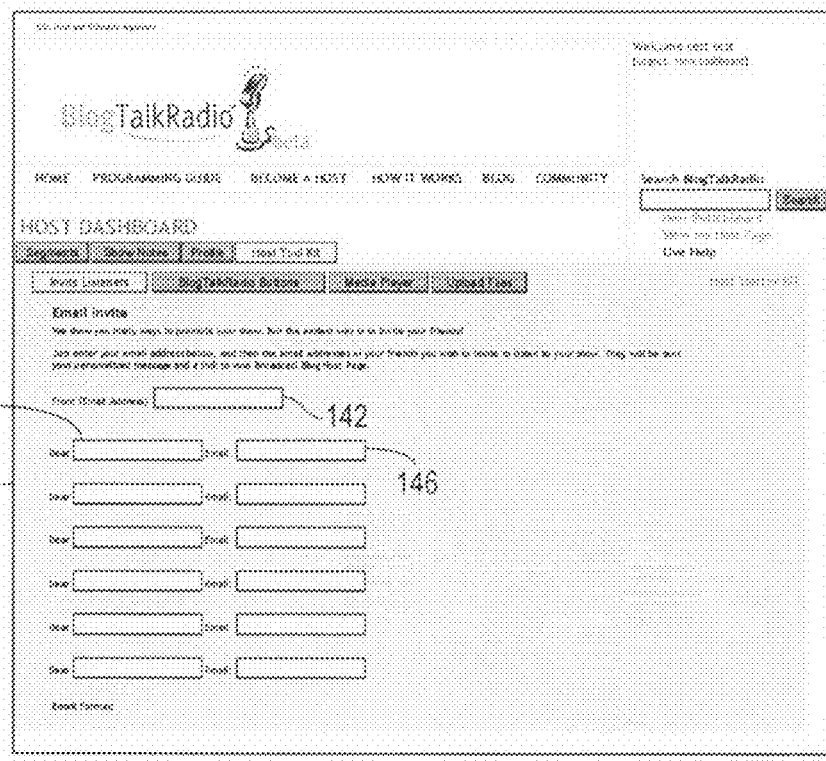
FIG. 11 illustrates an "invite listeners" web page generated by the web server of the audio server system in accordance with an embodiment of the present invention.

FIG. 11 illustrates an "invite listeners" web page 140 generated by the web server of the audio server system in accordance with an embodiment of the present invention. The web page 140 includes a variety of fields 142, 144 and 146 which permit the moderator to enter their e-mail address, and the name and e-mail address of the invitee. Then, the web server 46 utilizes the information in such fields, along with the show's schedule to send out invitations to potential listeners.

Figure 12:
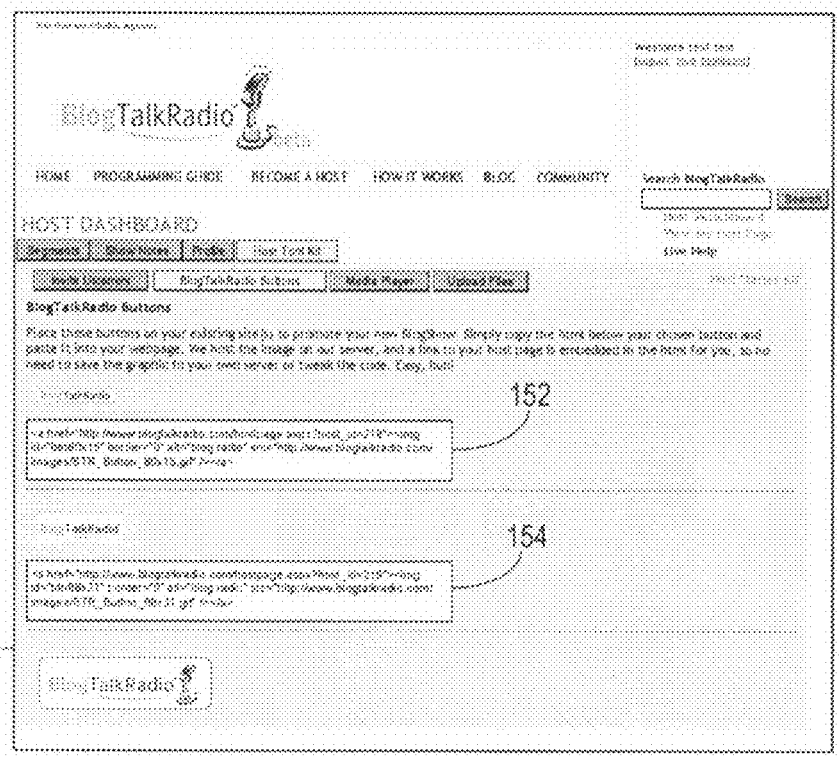
FIGS. 12 and 13 illustrate web pages generated by the web server of the audio server system in accordance with an embodiment of the present invention for automating the placement of buttons or hyperlinks on a moderator's web page.
Figure 13:

FIGS. 12 and 13 illustrate web pages 150 and 160 generated by the web server 46 of the audio server system 12 for automating the placement of buttons or hyperlinks on the moderator's web page. For example, the web page 150 includes one or more fields 152 and 154 containing instructions that can be copied and pasted onto the moderator's web page to form a button or hyperlink linking the moderator's web page with either a URL associated with a past or ongoing show to permit a connection to the streaming server 50. The moderator web page is typically not hosted by the web server 46. For example, the moderator could have a separate blog or web-site. It should be understood that the instructions in the fields 152 can be different to provide either different functionality or different style buttons or hyperlinks. Likewise, the web page 160 includes a field 162 containing instructions that can be copied and pasted onto the moderator's web page to form a button or hyperlink for downloading and setting up a suitable media player.

Figure 14:
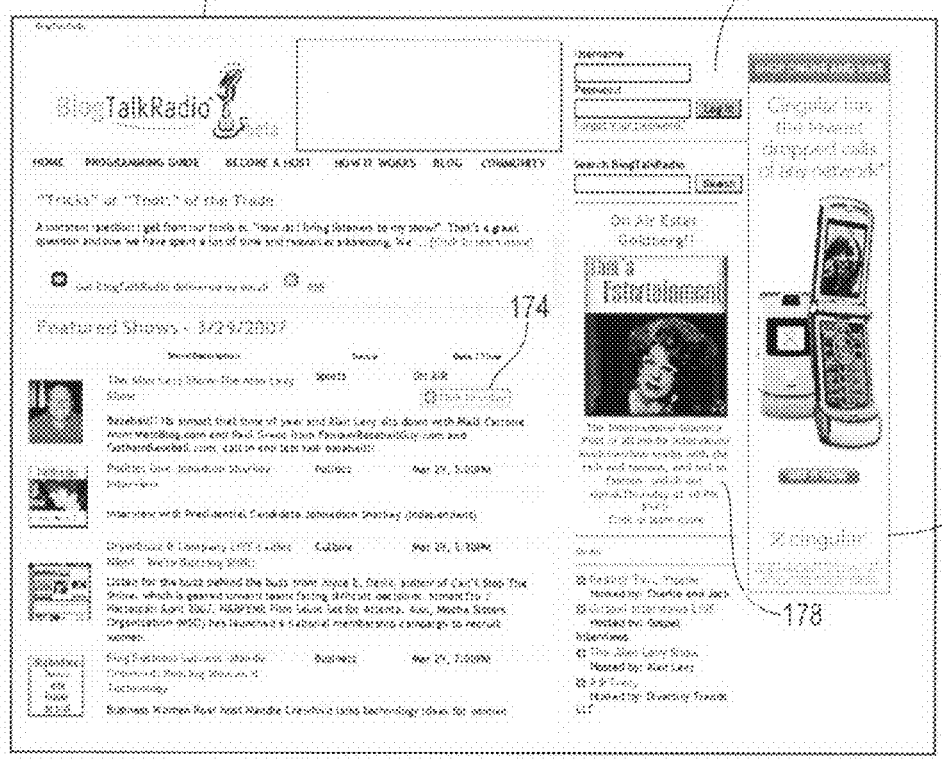
FIG. 14 illustrates a "featured shows" web page generated by the web server of the audio server system in accordance with an embodiment of the present invention.

FIG. 14 illustrates a "featured shows" web page 170 generated by the web server 46 of the audio server system 12. The web page 170 includes a featured show area 172 listing featured shows. In particular, it should be noted that in this example, the featured show area 172 includes a featured show (the Alan Levy show) that is ongoing, i.e., "on air". When a show is "on air", the featured show area 172 is provided with a button or hyperlink 174 permitting the viewer to connect to the streaming server 50 to hear the real-time or near real-time audio stream of the audio conference.

The web page 170 also includes a login area 176 permitting moderators to login to their account. The web page 170 also includes a variety of advertising areas 178 and 180.

In the preferred embodiment, the starting of the show includes: playing a 5-second countdown to the start of the show to the moderator, updating the status of the show in a database, starting the transmission of audio to both the first listener group and the second listener group to the audio conference, transmitting a jingle corresponding to the company that provides the audio conference services, and transmitting a greeting for the particular moderator or show. At this point, the show is in progress—the moderator is able to send audio into the audio conference and the listeners will be able to hear the audio. In addition, in a preferred embodiment, the conferencing system 44 sends a beep or other signal only to the moderator terminal 14 when a new guest or listener is added to the show.

In the preferred embodiment, the ending of the show includes: transmitting a countdown to the end of the show, a "goodbye" for the particular moderator or show, and an end prompt corresponding to the company that provides the audio conference services, terminating the transmission via the networks 20a and 20b, de-allocating the media server resources, and updating the status of the show in a database.

In the preferred embodiment, the conferencing system 44 of the audio server system 10 is programmed to reconnect a moderator upon a disconnection of the moderator from the audio conference without ending the audio conference. That is, a moderator may become improperly disconnected from the audio conference through an accidental hang-up, through a fault of the telephone network, through the fault of the company providing the audio conference service, or through any other method. After such disconnection, the conferencing system 44 preferably does not terminate the audio conference or stream for a predetermined period (such as five minutes or until the scheduled end of the show) to permit the moderator to re-connect. During the five minutes, if the moderator preferably calls the moderator telephone number and is properly identified (through a password or any other suitable method), then the moderator is immediately reconnected to the audio conference. The conferencing system 44 may transmit a "calling back into the show" prompt to the listeners or guests.

4. Variations on the Preferred Embodiments

The audio server system 12 preferably records a representation of the audio. The recording may include a recording of part or all of a show. The form of the recording is preferably a MP3 format or other suitable format that can be easily uploaded and downloaded via the Internet in a RSS, podcast, or other suitable manner. The recording of the audio is preferably accomplished by writing to the NFS server 47 connecting the NFS server 47 as a "listen-only" participant of the audio conference. The recording may, however, be accomplished by any appropriate portion of the system. A link to the recording may be provided on a web page and provided to listeners via the web server 46 after the termination of the audio conference.

The web server 46 of the audio server system 12 may also provide web pages containing information to the moderator related to the audio conference via a packet-switched network 20a (such as the Internet) and a web browser. The information is preferably provided in visual form, but may alternatively be provided in audio, tactile, or any other suitable form. The information is preferably provided to the moderator during the show, in real-time or near real-time (within a few seconds). The information preferably includes information on the show, such as the scheduled start time, the scheduled end time, and/or a countdown to the scheduled end time. The information preferably includes information on the listeners, such as one or more of the following: the number of first listeners in the first listener group, the CallerID of a first listener in the first listener group, the number of second listeners in the second listener group, the (approximate or exact) location of the second listeners in the second listener group. Exemplary web pages are shown in FIGS. 3-13.

In a variation of the preferred embodiment described above, the method and system may also include receiving input from the moderator via the packet-switched network 20b to allow a listener to add audio to the audio conference. Preferably, a listener (of either the first listener group or the second listener group) signals to the moderator that they wish to contribute to the audio conference. A listener from the first listener group preferably uses a dual-tone multi-frequency (DTMF) signal (such as "press '1' on your touch-tone phone if you want to contribute to the audio conference). A listener from the second listener group preferably sends a SMS, an email, or clicks a button on their browser (such as "click here to contribute to the audio conference"). Upon such signal, the listener is added to a listener queue. The listener queue is preferably ordered by the order in which the listener made a signal to contribute, with earlier requests at the front of the listener queue. The listener queue is preferably provided to the moderator via a packet-switched network (such as the Internet) and a web browser.

After providing the listener queue to the moderator, the moderator may choose to allow one or more of the listeners to contribute to the audio conference. The method and system preferably includes the step of accepting an input from the moderator via the Internet to join the listener into the audio conference, receiving audio from the listener, and transmitting a representation of the audio from the listener to the first listener group via the circuit-switched telephone network, and transmitting a representation of the audio from the listener to the second listener group via a packet-switched network. The step of accepting an input from the moderator via the Internet preferably includes accepting a simple "point and click" command from the moderator via a web browser, but may include any suitable method such as voice-recognition (e.g., "now connecting caller on line #2"). The step of accepting audio from the listener via a circuit-switched telephone network functions to accept voice, music, or any other suitable audio transmitted from the listener through the circuit-switched telephone network. The audio may be transmitted through the circuit-switched telephone network using any suitable audio codec. Preferably, the method and system evaluate the caller ID of the moderator, and use the G.729 audio codec for phone calls from an international (or remote) location and the PCMU audio codec for phone calls from a domestic (or nearby) location. However, other codecs could be used. The representation of the audio may be an exact representation of the voice, music, or any other suitable audio transmitted from the listener. The representation of the audio, however, is preferably a compressed, filtered, censored, or otherwise processed version of the voice, music, or any other suitable audio transmitted from the listener. The representation may include only audio from the listener, or may include audio from both the listener and the moderator.

In a further variation of the preferred embodiment described above, the moderator may control additional aspects of the audio conference in real-time or near real-time via a packet-switched network (such as the Internet) and a web browser. The additional controls include: muting or unmuting a listener, increasing or decreasing the volume of a listener, calling a listener (with or without a private chat), disconnecting a listener, playing, pausing, and stopping an audio file that combines with or substitutes for the audio from the moderator, and ending the audio conference. The moderator can place an outdial call through the conferencing system 44 to connect a guest or listener. The outdial request preferably contains a parameter indicating whether or not to provide a private chat with the listener prior to adding them to the audio conference. The listener is preferably added to the audio conference in full-duplex mode.

As a person skilled in the art will recognize from the previous detailed description and from the figures and claims, modifications and changes can be made to the preferred embodiments of the invention without departing from the scope of this invention defined in the following claims.

What is claimed is:

1. A method of providing an online communication platform, the method comprising:
   providing the online platform, by a conferencing server, to enable a moderator to establish a conference setup, wherein the conference setup enables the moderator to initiate a conference call via control panels offered through the online platform, further wherein the conference setup enables the moderator to engage in real-time bi-directional communication with one or more quests that are invited via the online platform to participate in the conference call initiated from the online control platform by the moderator;
   initiating, by the conferencing server, a first conference call subsequent to receiving a request from the moderator via the online platform, the initiating further including providing, by the online platform, information enabling the moderator to invite one or more quests to participate in the first conference call; and
   streaming substantially in real-time, by the conferencing server, audio associated with the conference call to the moderator, to the one or more quests, and to one or more listeners, wherein the one or more listeners listen in on the audio, the one or more listeners connecting with the first conference call using one or more online interfaces offered in conjunction with the online platform, the first conference call available as streaming media to the one or more listeners via the one or more online interfaces, wherein the one or more listeners are provided unidirectional communication capability of only receiving information associated with the conference call.

2. The method of claim 1, further comprising providing the moderator with a telephone number that corresponds to a moderator position within the audio conference.

3. The method of claim 1, further comprising maintaining the conference upon disconnection of the moderator from the conference, and reconnecting the moderator to the audio conference.

4. The method of claim 1, further comprising providing each of the one or more guests with a telephone number that corresponds to a listener position within the audio conference.

5. The method of claim 1, further comprising providing each of the one or more listeners with a URL that corresponds to a listener position within the audio conference.

6. The method of claim 1, wherein streaming the conference call to the one or more listeners via the Internet includes encoding and streaming a representation of the audio.

7. The method of claim 1, further comprising displaying information to the moderator related to the audio conference via the Internet.

8. The method of claim 7, wherein the information includes the caller identification of each of the one or more quests.

9. The method of claim 1, further comprising accepting a signal from each of the one or more quests indicating a desire to contribute audio to the audio conference.

10. The method of claim 9, wherein the signal includes one or more dialed tones on the PSTN.

11. The method of claim 9, further comprising displaying information to the moderator related to the audio conference via the Internet.

12. The method of claim 11, wherein displaying information to the moderator includes displaying information to the moderator via the Internet and an Internet browser.

13. The method of claim 11, wherein the information includes the indication from each of the one or more quests.

14. The method of claim 1, further comprising accepting an input from the moderator via the Internet to play an audio file, wherein transmitting a representation of the audio to each of the one or more quests and to each of the one or more listeners includes streaming a representation of the audio file.

15. The method of claim 1, further comprising recording a representation of the audio.

16. A server for providing an online communication platform, the server comprising:
- a network adapter through which to communicate with a plurality of client devices via a network;
- a memory device coupled to the network adapter and configured to store code corresponding to a series of operations for providing the online communication platform to one or more of the client devices, the series of operations including:
  - providing the online platform, by a conferencing server, to enable a moderator to establish a conference setup, wherein the conference setup enables the moderator to initiate a conference call via control panels offered through the online platform, further wherein the conference setup enables the moderator to engage in real-time bi-directional communication with one or more guests that are invited via the online platform to participate in the conference call initiated from the online control platform by the moderator;
  - initiating, by the conferencing server, a first conference call subsequent to receiving a request from the moderator via the online platform, the initiating further including providing, by the online platform, information enabling the moderator to invite one or more guests to participate in the first conference call; and
  - streaming substantially in real-time, by the conferencing server, audio associated with the conference call to the moderator, to the one or more guests, and to one or more listeners, wherein the one or more listeners listen in on the audio, the one or more listeners connecting with the first conference call using one or more online interfaces offered in conjunction with the online platform, the first conference call available as streaming media to the one or more listeners via the one or more online interfaces, wherein the one or more listeners are provided unidirectional communication capability of only receiving information associated with the conference call.

17. The server of claim 16, wherein the set of operations further comprises providing the moderator with a telephone number that corresponds to a moderator position within the audio conference.

18. The server of claim 16, wherein the set of operations further comprises maintaining the conference upon disconnection of the moderator from the conference, and reconnecting the moderator to the audio conference.

19. The server of claim 16, wherein the set of operations further comprises providing each of the one or more guests with a telephone number that corresponds to a listener position within the audio conference.

20. The server of claim 16, wherein the set of operations further comprises providing each of the one or more listeners with a URL that corresponds to a listener position within the audio conference.

21. The server of claim 16, wherein streaming the conference call to the one or more listeners via the Internet includes encoding and streaming a representation of the audio.

22. The server of claim 16, wherein the set of operations further comprises displaying information to the moderator related to the audio conference via the Internet.

23. The server of claim 22, wherein the information includes the caller identification of each of the one or more guests.

24. The server of claim 16, wherein the set of operations further comprises accepting a signal from each of the one or more guests indicating a desire to contribute audio to the audio conference.

25. The server of claim 1, wherein the set of operations further comprises accepting an input from the moderator via the Internet to play an audio file, wherein transmitting a representation of the audio to each of the one or more guests and to each of the one or more listeners includes streaming a representation of the audio file.

26. The server of claim 1, wherein the set of operations further comprises recording a representation of the audio.

* * * * *